United States Patent
Hoshida et al.

(10) Patent No.: US 8,244,138 B2
(45) Date of Patent: Aug. 14, 2012

(54) POLARIZATION-MULTIPLEXING OPTICAL TRANSMITTER POLARIZATION-MULTIPLEXING OPTICAL RECEIVER, POLARIZATION-MULTIPLEXING OPTICAL TRANSCEIVING SYSTEM, AND CONTROLLING METHOD THEREOF

(75) Inventors: Takeshi Hoshida, Kawasaki (JP); Jens Rasmussen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 899 days.

(21) Appl. No.: 12/071,984

(22) Filed: Feb. 28, 2008

(65) Prior Publication Data
US 2008/0232816 A1   Sep. 25, 2008

(30) Foreign Application Priority Data

Mar. 20, 2007 (JP) ................................. 2007-072206
Feb. 26, 2008 (JP) ................................. 2008-045200

(51) Int. Cl.
*H04B 10/00* (2006.01)
(52) U.S. Cl. ............ 398/152; 398/32; 398/65; 398/184; 398/208
(58) Field of Classification Search ............... 398/32, 398/65, 152, 184, 192, 201, 205, 208
See application file for complete search history.

(56) References Cited

U.S. PATENT DOCUMENTS

| | | | | |
|---|---|---|---|---|
| 5,329,396 A * | 7/1994 | Fishman et al. | .............. | 398/147 |
| 6,072,618 A * | 6/2000 | Takenaka | ...................... | 359/239 |
| 6,577,413 B1 | 6/2003 | Saunders | | |
| 6,626,588 B1 * | 9/2003 | Sasai et al. | ...................... | 398/32 |
| 6,634,808 B2 * | 10/2003 | Glingener | ........................ | 398/65 |
| 6,661,814 B1 * | 12/2003 | Chapman et al. | .................. | 372/6 |
| 6,674,936 B2 * | 1/2004 | Jacobowitz et al. | ............. | 385/24 |
| 7,305,183 B2 * | 12/2007 | Roberts et al. | ................... | 398/28 |
| 2002/0003641 A1 * | 1/2002 | Hall et al. | ...................... | 359/122 |
| 2002/0191265 A1 * | 12/2002 | LaGasse et al. | ............... | 359/246 |
| 2003/0039005 A1 * | 2/2003 | Roberts et al. | ................. | 359/122 |
| 2003/0128982 A1 * | 7/2003 | Glingener | ........................ | 398/65 |
| 2004/0016874 A1 * | 1/2004 | Rao et al. | ...................... | 250/225 |

(Continued)

FOREIGN PATENT DOCUMENTS

JP   62-024731   2/1987

(Continued)

OTHER PUBLICATIONS

Japanese Office Action mailed Nov. 22, 2011 issued in corresponding Japanese Patent Application No. 2008-045200.

*Primary Examiner* — Li Liu
(74) *Attorney, Agent, or Firm* — Staas & Halsey LLP

(57) ABSTRACT

By using low-frequency signals, an optical transmitting unit modulates one of a wavelength, a transmission timing, and an intensity of light as a carrier wave. A polarization multiplexer synthesizes the output light signals, modulated by the optical transmitting unit, in polarization states orthogonal to each other and generates polarization-multiplexing signals. A polarization splitter splits by extracting two orthogonal polarization components from the polarization-multiplexing signals. The polarization states of the polarization-multiplexing signals are controlled by a polarization controller in an optical receiving unit. A band-pass filter extracts components transmitting through passbands from output signals of the optical receiving unit and outputs an intensity of the components. Based on the intensity output from the filter, a controlling circuit generates feedback control signals for maximizing a ratio of the components of the low-frequency signals and by using the feedback control signals, the polarization controller controls the polarization states of the optical multiplexing signals.

12 Claims, 10 Drawing Sheets

U.S. PATENT DOCUMENTS

| | | | |
|---|---|---|---|
| 2005/0249505 A1* | 11/2005 | Manderscheid et al. | 398/177 |
| 2005/0265728 A1* | 12/2005 | Yao | 398/152 |
| 2007/0134000 A1* | 6/2007 | Lee et al. | 398/155 |
| 2007/0280689 A1* | 12/2007 | Boffi et al. | 398/65 |
| 2008/0138070 A1* | 6/2008 | Yan et al. | 398/65 |

FOREIGN PATENT DOCUMENTS

| | | |
|---|---|---|
| JP | 05-093935 | 4/1993 |
| JP | 2002-344426 | 11/2002 |
| JP | 2005-20151 | 1/2005 |

\* cited by examiner

POLARIZATION-MULTIPLEXING OPTICAL TRANSMITTER POLARIZATION-MULTIPLEXING OPTICAL RECEIVER, POLARIZATION-MULTIPLEXING OPTICAL TRANSCEIVING SYSTEM, AND CONTROLLING METHOD THEREOF

BACKGROUND OF THE INVENTION

1. Field of the Invention

The present invention relates to a polarization-multiplexing optical transmitter, a polarization-multiplexing optical receiver, a polarization-multiplexing optical transceiving system, and a controlling method thereof useful for transmission using polarization multiplexing, and, more particularly to a polarization-multiplexing optical transmitter, a polarization-multiplexing optical receiver, a polarization-multiplexing optical transceiving system, and a controlling method thereof that can stably split polarization components.

2. Description of the Related Art

For implementing an ultra-high speed optical transmission system of more than or equal to 40 gigabits per second (Gbit/s), a polarization multiplexing technology has attracted considerable interest. In the polarization multiplexing technology, two polarization states that are orthogonal to each other are available in a same wavelength signal and by using the two polarization states or components, data of two interdependent signals is transmitted. By using the polarization multiplexing technology, a modulating speed can be reduced to half. A technology related to the transmission system using the polarization multiplexing technology is disclosed in Japanese Patent Application Laid-open No. S62-024731.

The polarization states of polarization-multiplexing signals receive effects such as bending, birefringence, and oscillation of a transmission optical fiber. Due to this, when signals are reached to a receiver, uncertainty and temporal variation of polarization states are accompanied with the signals. Thus, for stably splitting polarization components on a receiving side, a specific adaptive control is required. In the transmission system disclosed in Japanese Patent Application Laid-open No. S62-024731, for detecting whether polarization splitting is in an appropriate state, a control bit-string that is not related with input data is additionally included with respect to a bit sequence transmitted to two polarization channels. However, on the receiving side, adding a function that performs a complex signaling process is required. Due to this, a structure of a transmitter becomes complicated. Furthermore, by adding the control bit-string, because a mark ratio of each polarization channel varies from half, optimization of bit error rate (BER) characteristics of the receiver becomes complicated. Further, because transmission is to be carried out in a bit rate higher than the bit rate of the input data, the structure of the receiver also becomes complicated.

SUMMARY OF THE INVENTION

It is an object of the present invention to at least partially solve the problems in the conventional technology.

According to an aspect of the present invention, a polarization-multiplexing optical transmitter includes a first optical transmitting unit that outputs, based on a first input signal, a first modulated light; a second optical transmitting unit that outputs, based on a second input signal differing from the first input signal, a second modulated light; a polarization multiplexer that generates, by synthesizing in polarization states orthogonal to each other, the first modulated light output from the first optical transmitting unit and the second modulated light output from the second optical transmitting unit, polarization-multiplexing signals, and externally transmits the polarization-multiplexing signals; and a signal generator that generates predetermined pilot signals, wherein at least any one of the first optical transmitting unit and the second optical transmitting unit modulates, by using the pilot signals generated by the signal generator, at least any one of a wavelength, a transmission timing, and an intensity of light that is a carrier wave.

According to another aspect of the present invention, a polarization-multiplexing optical receiver includes a polarization controller that controls polarization states of externally received polarization-multiplexing signals; a polarization splitter that splits, upon respectively extracting, from the polarization-multiplexing signals of which the polarization states are controlled by the polarization controller, a first polarization component and a second polarization component orthogonal to each other; a first optical receiving unit that receives the first polarization component split by the polarization splitter, and externally transmits a first input signal detected from the first polarization component; a second optical receiving unit that receives the second polarization component split by the polarization splitter, and externally transmits a second input signal, differing from the first input signal, detected from the second polarization component; an extracting unit that extracts a pilot signal from one of the first and second polarization components received by the first and second optical receiving units, and outputs an intensity of the pilot signals; and a controlling unit that generates control signals for maximizing or minimizing the intensity output by the extracting unit, thereby the polarization controller controls, based on the control signals generated by the controlling unit, the polarization states of the polarization-multiplexing signals.

According to still another aspect of the present invention, a polarization-multiplexing optical receiver includes a polarization controller that controls polarization states of externally received polarization-multiplexing signals; a polarization splitter that splits, upon respectively extracting, from the polarization-multiplexing signals of which the polarization states are controlled by the polarization controller, a first polarization component and a second polarization component orthogonal to each other; a first optical receiving unit that receives the first polarization component split by the polarization splitter, and externally transmits a first input signal detected from the first polarization components; a second optical receiving unit that receives the second polarization component split by the polarization splitter, and externally transmits a second input signal, differing from the first input signal, detected from the second polarization component; a correlation calculating unit that calculates a correlation value between signals corresponding to the first and second polarization components received by the first optical receiving unit and the second optical receiving unit; and a controlling unit that generates control signals for minimizing the correlation value calculated by the correlation calculating unit, thereby the polarization controller controls, based on the control signals generated by the controlling unit, the polarization states of the polarization-multiplexing signals.

According to still another aspect of the present invention, a polarization-multiplexing optical transceiving system includes a polarization-multiplexing optical transmitter and a polarization-multiplexing optical receiver. The polarization-multiplexing optical transmitter includes a first optical transmitting unit that outputs, based on a first input signal, a first modulated light; a second optical transmitting unit that outputs, based on a second input signal differing from the first input signal, a second modulated light; a polarization multiplexer that generates, by synthesizing in polarization states orthogonal to each other, the first modulated light output from the first optical transmitting unit and the second modulated light output from the second optical transmitting unit, polarization-multiplexing signals, and transmits the polarization-multiplexing signals to the polarization-multiplexing optical receiver; and a signal generator that generates predetermined pilot signals, wherein at least any one of the first optical transmitting unit and the second optical transmitting unit modulates, by using the pilot signals generated by the signal generator, at least any one of a wavelength, a transmission timing, and an intensity of light that is a carrier wave. The polarization-multiplexing optical receiver includes a polarization controller that controls polarization states of the polarization-multiplexing signals received from the polarization-multiplexing optical transmitter; a polarization splitter that splits, upon respectively extracting, from the polarization-multiplexing signals of which the polarization states are controlled by the polarization controller, a first polarization component and a second polarization component orthogonal to each other; a first optical receiving unit that receives the first polarization component split by the polarization splitter, and externally transmits a first input signal detected from the first polarization components; a second optical receiving unit that receives the second polarization component split by the polarization splitter, and externally transmits a second input signal, differing from the first input signal, detected from the second polarization components; an extracting unit that extracts the pilot signals from one of the first and second polarization components received by the first optical receiving unit and the second optical receiving unit, and outputs an intensity of the pilot signals; and a controlling unit that generates control signals for maximizing or minimizing the intensity output by the extracting unit, thereby the polarization controller controls, based on the control signals generated by the controlling unit, the polarization states of the polarization-multiplexing signals.

According to still another aspect of the present invention, there is provided a method for controlling a polarization-multiplexing optical transceiving system including a polarization-multiplexing optical transmitter and a polarization-multiplexing optical receiver. The method includes, in the polarization-multiplexing optical transmitter, transmitting a first modulated light based on a first input signal, transmitting a second modulated light based on a second input signal differing from the first input signal, generating, by synthesizing in polarization states orthogonal to each other, the first modulated light and the second modulated light, polarization-multiplexing signals, and transmitting the polarization-multiplexing signals to the polarization-multiplexing optical receiver, and generating predetermined pilot signals, wherein at one of the first modulated light transmitting step and the second modulated light transmitting step, further modulating, by using the pilot signals, at least any one of a wavelength, a transmission timing, and an intensity of light that is a carrier wave. The method also includes, in the polarization-multiplexing optical receiver, controlling polarization states of the polarization-multiplexing signals received from the polarization-multiplexing optical transmitter, splitting, upon respectively extracting, from the polarization-multiplexing signals of which the polarization states are controlled at the polarization controlling step, a first polarization component and a second polarization component orthogonal to each other, receiving the first polarization component, and externally transmitting a first input signal detected from the first polarization components, receiving the second polarization component, and externally transmitting a second input signal, differing from the first input signal, detected from the second polarization components, extracting the pilot signals from one of the first polarization components and the second polarization components, and outputting an intensity of the pilot signals, and generating control signals for maximizing or minimizing the intensity, thereby at the polarization states controlling step, the polarization states of the polarization-multiplexing signals are controlled based on the control signals.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the polarization-multiplexing optical transmitter, the polarization-multiplexing optical receiver, the polarization-multiplexing optical transceiving system, and the controlling method thereof according to the present invention are explained below in detail with reference to the accompanying drawings.

Figure 1:
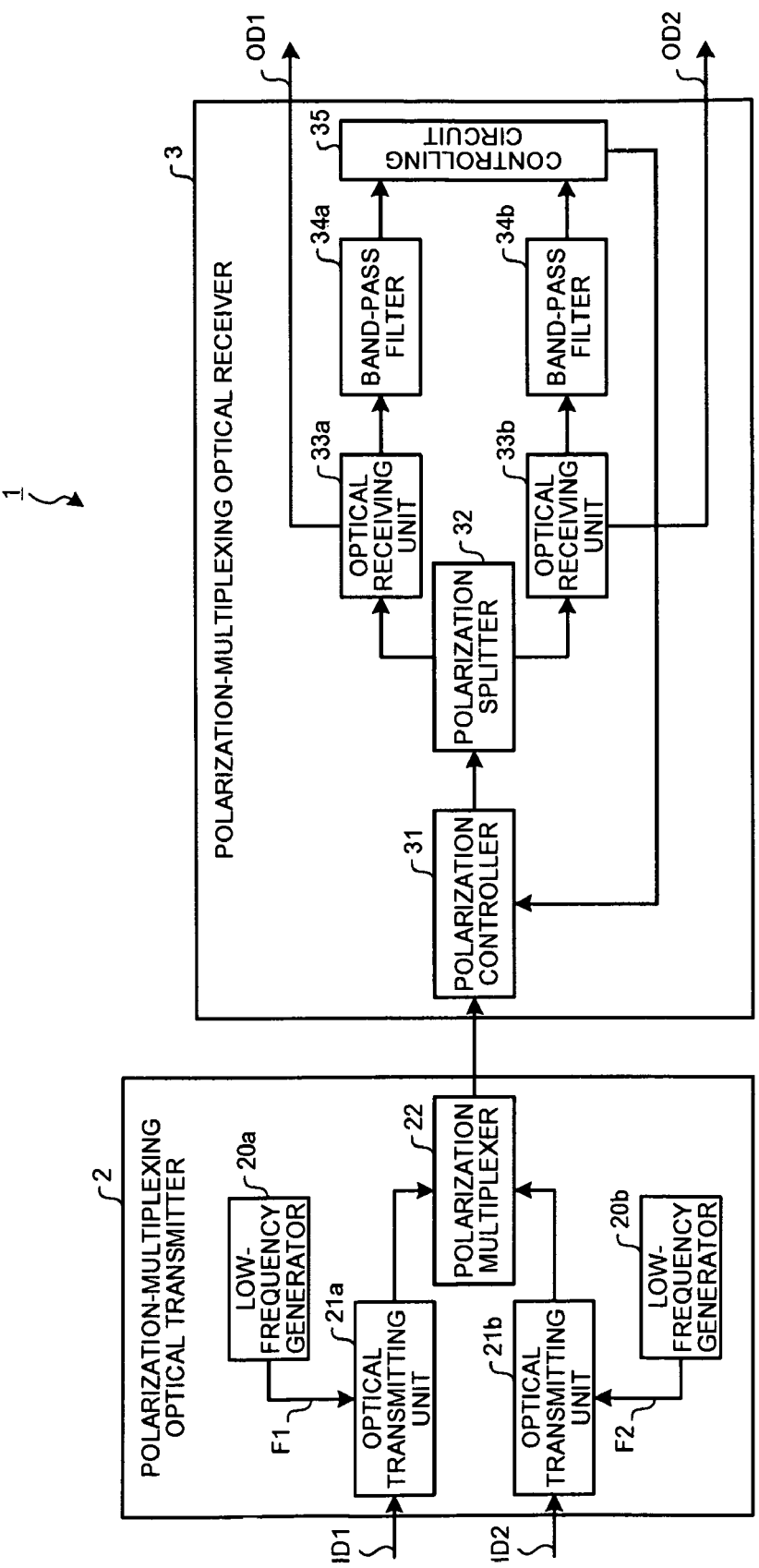
FIG. 1 is a block diagram of a polarization-multiplexing optical transceiving system according to a first embodiment of the present invention.

A structure of a polarization-multiplexing optical transceiving system according to a present embodiment is explained first. FIG. 1 is a block diagram of a polarization-multiplexing optical transceiving system according to a first embodiment. As shown in FIG. 1, a polarization-multiplexing optical transceiving system 1 includes a polarization-multiplexing optical transmitter 2 and a polarization-multiplexing optical receiver 3. The polarization-multiplexing optical transmitter 2 and the polarization-multiplexing optical receiver 3 are connected by an optical transmission line of a wavelength division multiplexing system (WDM).

The polarization-multiplexing optical transmitter 2 includes low-frequency generators 20a and 20b, optical transmitting units 21a and 21b, and a polarization multiplexer (polarization beam combiner (PBC)) 22. The optical transmitting units 21a and 21b and the polarization multiplexer 22 are respectively connected by a polarization maintaining fiber (PMF).

The low-frequency generators 20a and 20b generate low-frequency signals F1 and F2 including a predetermined pattern identifiable between the polarization-multiplexing optical transmitter 2 and the polarization-multiplexing optical receiver 3 and transmits the low-frequency signals F1 and F2 to the optical transmitting units 21a and 21b. The low-frequency signals F1 and F2 are cyclic pilot signals and a frequency lower than a frequency of input data signals ID1 and ID2 is desirable. The frequency that is less than or equal to one hundredth of a modulating speed of the input data signals ID1 and ID2 is further desirable. The frequency of the low-frequency signals F1 output from the low-frequency generator 20a and the frequency of the low-frequency signals F2 output from the low-frequency generator 20b are respectively set in a different frequency. The low-frequency signals F1 and F2 are not always required to be continuously output. If the output of the low-frequency signals F1 and F2 is sufficiently continuous to enable identification of the low-frequency signals F1 and F2, the low-frequency signals F1 and F2 can be intermittently output.

The optical transmitting units 21a and 21b output modulated signals according to the input data signals ID1 and ID2, by modulating any one of an optical phase, an intensity (amplitude), and a frequency of light, which is a carrier wave. As a modulation method, a phase modulation that changes the optical phase, an intensity modulation that changes an optical intensity, or a frequency modulation that changes an optical frequency can be used. As specific modulation methods, differential phase modulation methods such as a differential phase shift keying (DPSK) and a differential quadrature phase shift keying (DQPSK), and intensity modulation methods such as a non-return to zero (NRZ) and a return to zero (RZ) are included. Furthermore, as a receiving method, the demodulation method using a direct detection method or a coherent receiving method is used. The input data signals ID1 and ID2 can be signals obtained by splitting into two, one data signal and also can be separate data signals not related with each other. A bit rate of the input data signals ID1 and ID2 can be same or different. Even if it is assumed that each wavelength of a light output from the optical transmitting units 21a and 21b is nearly same, the wavelength of the light can be different in a range where optical modulation spectrum bands are overlapping each other.

The polarization multiplexer 22 synthesizes the output light modulated by the optical transmitting unit 21a and the output light modulated by the optical transmitting unit 21b in the polarization components orthogonal to each other and generates polarization-multiplexing signals. The polarization multiplexer 22 transmits the generated polarization-multiplexing signals to the polarization-multiplexing optical receiver 3.

Figure 2:
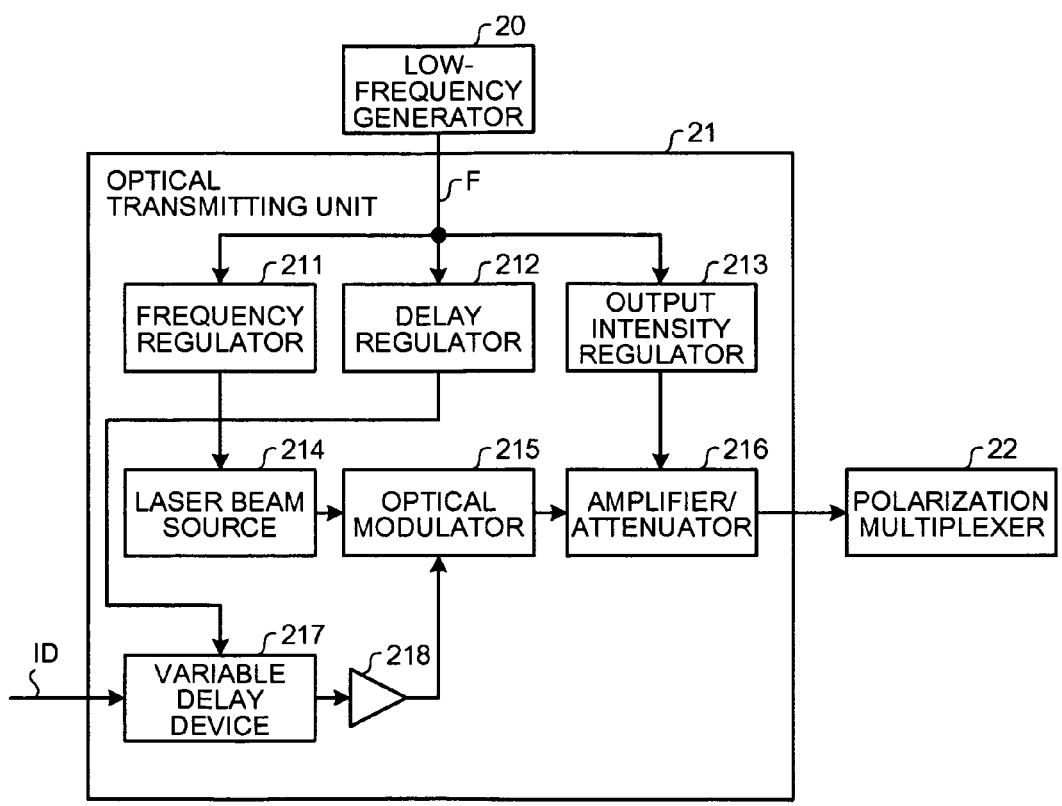
FIG. 2 is a block diagram of an optical transmitting unit according to the first embodiment.

A detailed structure of the optical transmitting unit 21 is explained with reference to FIG. 2. FIG. 2 is a block diagram of the optical transmitting unit 21 according to the first embodiment. As shown in FIG. 2, the optical transmitting unit 21 includes a frequency regulator 211, a delay regulator 212, an output intensity regulator 213, a laser beam source 214, an optical modulator 215, an amplifier/attenuator 216, a variable delay device 217, and a drive amplifier 218.

The low-frequency signals F output from the low-frequency generator 20 are input into at least any one of the frequency regulator 211, the delay regulator 212, and the output frequency regulator 213 of the optical transmitting unit 21. By considering all conditions, an input destination of the low-frequency signals F can be appropriately decided at the time of designing. The input of the low-frequency signals F into the frequency regulator 211, the delay regulator 212, and the output intensity regulator 213 is sequentially explained below.

The input of the low-frequency signals F into the frequency regulator 211 is explained first. The frequency regulator 211 controls the laser beam source 214 emitting a laser beam of a wavelength $\lambda 1$, which is the carrier wave. To be specific, the frequency regulator 211 controls the laser beam source 214 such that the wavelength $\lambda 1$ of the laser beam emitted from the laser beam source 214 is minutely swung by the low-frequency signals F and is modified. For example, when the frequency of the low-frequency signals F is 1 kilohertz (kHz), a wavelength of the laser beam is minutely swung to a long-wavelength and a short-wavelength in a cycle of 1 millisecond (ms) and is modified. It is necessary to decide an amplitude of the wavelength swing according to a spacing up to an adjacent channel performing multiplex transmission. For example, if the spacing up to the adjacent channel is 0.4 to 0.8 nanometer (nm), modifying the amplitude of the wavelength swing in a range within 0.01 nm is desirable.

The input of the low-frequency signals F into the delay regulator 212 is explained next. The delay regulator 212 controls the variable delay device 217 provided on a path that is used by the input data signals ID to input into the optical modulator 215. To be specific, the delay regulator 212 controls the variable delay device 217 such that a transmission timing of data modulated by the optical modulator 215 is minutely swung by the low-frequency signals F and is modified. A swinging of the transmission timing of data to be modulated is called a jitter. When the jitter is generated in the variable delay device 217, restraining a jitter quantity less than or equal to one fifth of one coding time period of the modulated data is desirable because upon excessively increasing the jitter quantity, an error rate on a receiving side increases and quality deterioration of received signals is also likely to be increased.

The input of the low-frequency signals F into the output intensity regulator 213 is explained next. The output intensity regulator 213 controls the amplifier/attenuator 216 that amplifies/attenuates the signals output from the optical modulator 215. To be specific, the output intensity regulator 213 controls the amplifier/attenuator 216 such that the intensity (amplitude) of the signals amplified/attenuated by the amplifier/attenuator 216 is minutely swung by the low-frequency signals F and is modified. It is desirable to modify the intensity, for example, in a range in which the amplitude of the swing is within ± several percentage, when the intensity, upon not inputting the low-frequency signals F, is 100 percent. If the amplitude of the swing excessively increases, especially when significantly swings on a negative side, a noise increases and the quality deterioration of the transmission signals is also likely to be increased. When the laser beam source 214 includes a function for regulating an optical output intensity, it is not necessary to separately provide the output intensity regulator 213 and the function can be implemented in the laser beam source 214. Furthermore, when the optical modulator 215 includes a function for regulating the optical output intensity, it is not necessary to separately provide the output intensity regulator 213 and the function can be used in the optical modulator 215.

The polarization-multiplexing optical receiver 3 shown in FIG. 1 includes a polarization controller 31, a polarization splitter (polarization beam splitter (PBS)) 32, optical receiving units 33a and 33b, band-pass filters 34a and 34b, and a controlling circuit 35.

The polarization controller 31 controls the polarization states of the polarization-multiplexing signals transmitted from the polarization-multiplexing optical transmitter 2 via the optical transmission line such that the polarization states match with a polarization axis of the polarization splitter 32. The polarization controller 31 controls the polarization states of the polarization-multiplexing signals by using feedback control signals transmitted from the controlling circuit 35 that is mentioned later. From the polarization-multiplexing signals of which the polarization states are controlled by the polarization controller 31, the polarization splitter 32 respectively extracts and splits two orthogonal polarization components.

The optical receiving unit 33a receives the signals transmitted from the optical transmitting unit 21a and outputs to the band-pass filter 34a, and also externally outputs an output data signal OD1. The optical receiving unit 33b receives the signals transmitted from the optical transmitting unit 21b and outputs to the band-pass filter 34b, and also externally outputs an output data signal OD2.

The band-pass filter 34a extracts from the output signals of the optical receiving unit 33a, components transmitting through passbands and outputs the intensity of the filtered component as output signals to the controlling circuit 35. In the band-pass filter 34a, the passbands are set such that the frequency of the low-frequency signals F1 is included. The band-pass filter 34b extracts from the output signals of the optical receiving unit 33b, the components transmitting through the passbands and outputs the intensity of the filtered components as the output signals to the controlling circuit 35. In the band-pass filter 34b, the passbands are set such that the frequency of the low-frequency signals F2 is included.

When the controlling circuit 35 receives the output signals from the band-pass filter 34a, based on a cycle in which the output signals are changed, a cycle of the low-frequency signals F1, and a cycle of the low-frequency signals F2, the controlling circuit 35 calculates a ratio of the components of the low-frequency signals F1 and the components of the low-frequency signals F2 included in the components of all the output signals from the band-pass filter 34a. The controlling circuit 35 generates the feedback control signals for maximizing the ratio of the components of the low-frequency signals F1 and transmits to the polarization controller 31. Upon receiving the output signals from the band-pass filter 34b, based on the cycle in which the output signals are changed, the cycle of the low-frequency signals F1, and the cycle of the low-frequency signal F2, the controlling circuit 35 calculates the ratio of the components of the low-frequency signals F1 and the components of the low-frequency signals F2 included in the components of all the output signals from the band-pass filter 34b. Then, the controlling circuit 35 generates the feedback control signals for maximizing the ratio of the components of the low-frequency signals F2 and transmits to the polarization controller 31.

While transmitting the feedback control signals to the polarization controller 31, based on the signals output from any one of the band-pass filters 34a and 34b, the controlling circuit 35 can generate and transmit the feedback control signals. Thus, any one of the band-pass filters 34a and 34b can be included. When any one of the band-pass filters 34a and 34b is included, a low-pass filter can be used as a band-pass filter. Even if both the band-pass filters 34a and 34b are included, the low-pass filter can be used for the band-pass filter corresponding to low frequency signals having a low frequency among the low-frequency signals F1 and F2.

Figure 3:
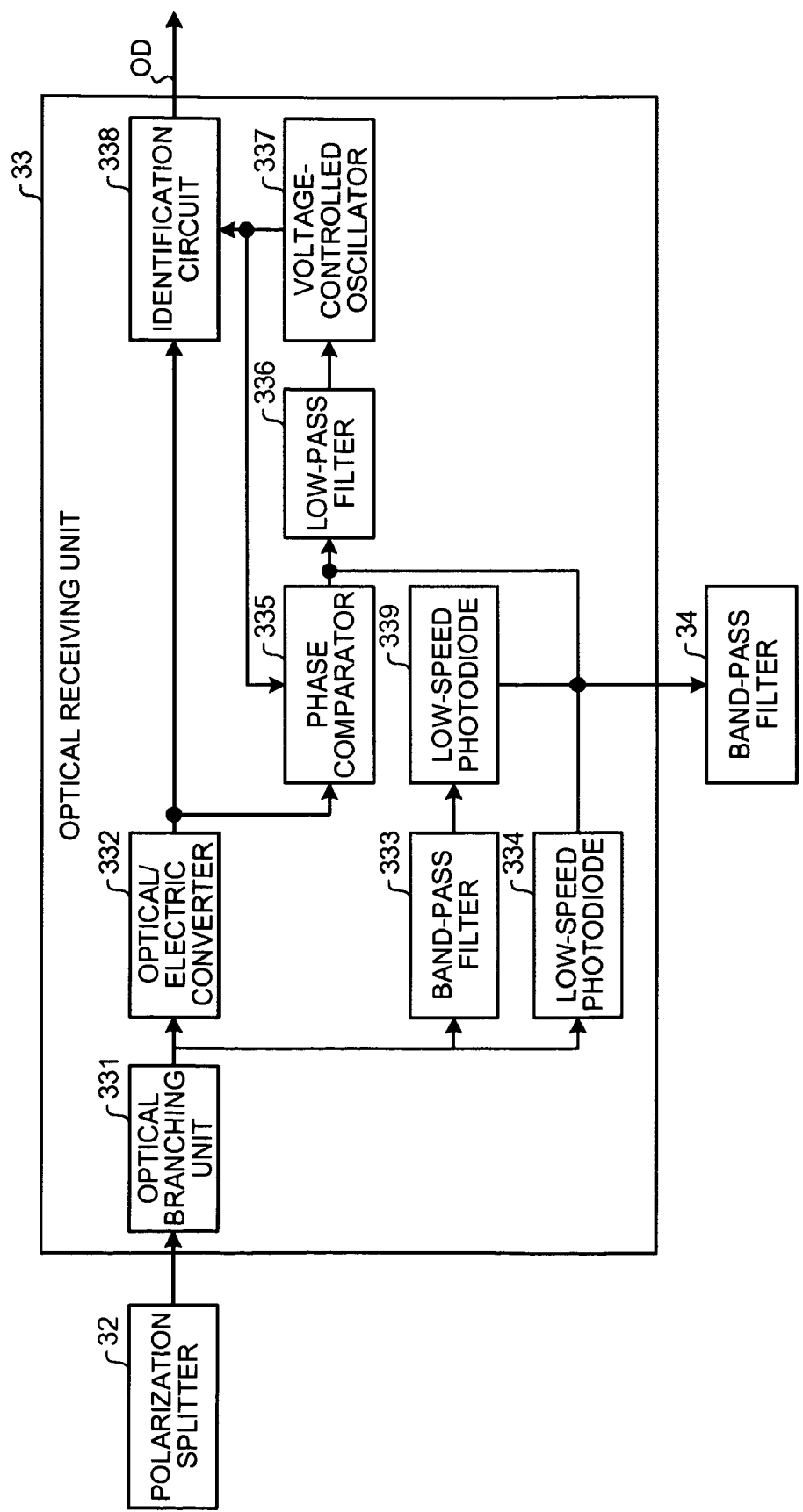
FIG. 3 is a block diagram of an optical receiving unit according to the first embodiment.

A detailed structure of the optical receiving unit 33 is explained with reference to FIG. 3. FIG. 3 is a block diagram of the optical receiving unit 33 according to the first embodiment. As shown in FIG. 3, the optical receiving unit 33 includes an optical branching unit 331, an optical/electric converter 332, a band-pass filter 333, low-speed photodiodes 334 and 339, a phase comparator 335, a low-pass filter 336, a voltage-controlled oscillator (VCO) 337, and an identification circuit 338.

From the two components split by the polarization splitter 32, the optical branching unit 331 branches any one component into the optical/electric converter 332, the band-pass filter 333, and the low-speed photodiode 334.

The optical/electric converter 332 converts input optical signals into electric signals and amplifies and outputs the electric signals. A structure of the optical/electric converter 332 may be changed according to the used modulation method. The optical/electric converter 332 according to each modulation method is explained with reference to FIGS. 4 to 7.

Figure 4:
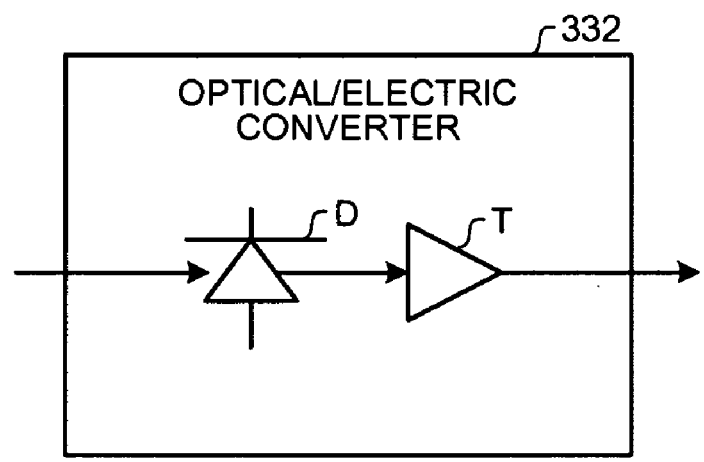
FIG. 4 is a schematic of an optical/electric converter when intensity modulation methods such as an NRZ and an RZ are used according to the first embodiment.
Figure 5:
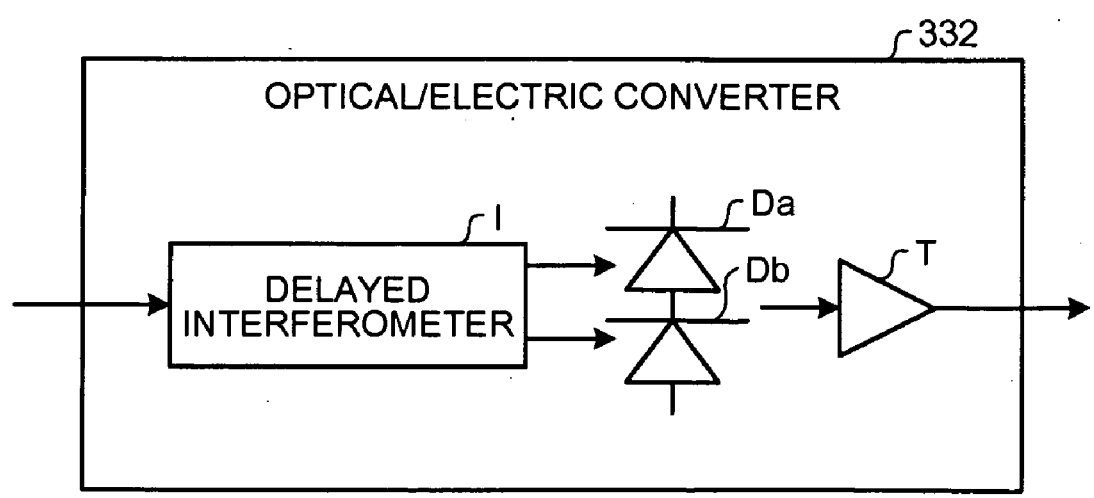
FIG. 5 is a schematic of the optical/electric converter when a DPSK is used according to the first embodiment.
Figure 6:
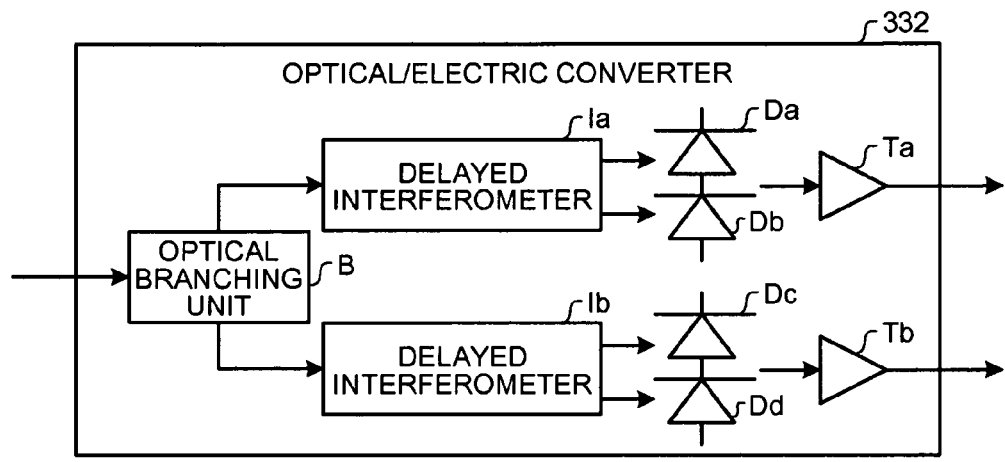
FIG. 6 is a schematic of the optical/electric converter when a DQPSK is used according to the first embodiment.
Figure 7:
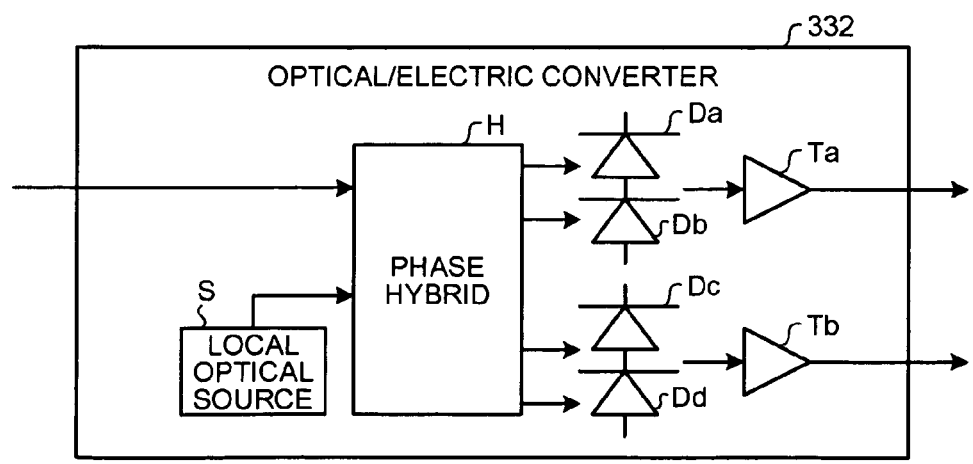
FIG. 7 is a schematic of the optical/electric converter when a coherent receiver is used according to the first embodiment.

FIG. 4 is a schematic of the optical/electric converter 332 when the intensity modulation methods such as the NRZ and the RZ are used. As shown in FIG. 4, the optical/electric converter 332 includes a photodiode D and a trans-impedance amplifier T. The trans-impedance amplifier T is a circuit that converts an electric current into a voltage. FIG. 5 is a schematic of the optical/electric converter 332 when the DPSK is used. As shown in FIG. 5, the optical/electric converter 332 includes a delayed interferometer I, photodiodes Da and Db, and the trans-impedance amplifier T. The delayed interferometer I is a circuit that converts optical phase data into optical intensity data. FIG. 6 is a schematic of the optical/electric converter 332 when the DQPSK is used. As shown in FIG. 6, the optical/electric converter 332 includes an optical branching unit B, delayed interferometers Ia and Ib, photodiodes Da to Dd, and trans-impedance amplifiers Ta and Tb. FIG. 7 is a schematic of the optical/electric converter 332 when a coherent receiver is used. As shown in FIG. 7, the optical/electric converter 332 includes a local optical source S, a phase hybrid H, the photodiodes Da to Dd, and the trans-impedance amplifiers Ta and Tb. The phase hybrid H is a circuit that synthesizes two input lights.

As shown in FIG. 3, the phase comparator 335, the low-pass filter 336, and the voltage-controlled oscillator 337 form a clock regeneration circuit. The clock regeneration circuit regenerates a clock synchronizing with the received signals.

The identification circuit 338 identifies contents of the received signals. To be specific, the identification circuit 338 identifies whether each bit of the received signals is 1 or 0.

The band-pass filter 333 has narrow passbands. As the band-pass filter 333, for example, a Fabry-Perot resonator can be used. A salient feature of the Fabry-Perot resonator is that a transmissive frequency and a non-transmissive frequency is repeated in a predetermined cycle when the frequency is indicated on a horizontal axis and a transmissivity is indicated on a vertical axis. In other words, a peak of the transmissivity is indicated for each predetermined cycle. The cycle can also be adjusted. Thus, by adjusting the cycle to a channel spacing or to a fraction of the channel spacing of a wavelength multiplexing system, the wavelength multiplexing system can easily carry out transceiving in any wavelength.

The low-speed photodiodes 334 and 339, which are slow photodiodes of approximately 1 kHz, convert the input optical signals into the electric signals and output the electric signals.

Salient features of the optical receiving unit 33 are that the signals including the components of the low-frequency signals F1 and F2 output from the optical transmitting units 21a and 21b of the polarization-multiplexing optical transmitter 2 are output to the band-pass filter 34 of the polarization-multiplexing optical receiver 3 and by the band-pass filter 34, the components of the low-frequency signals F1 and F2 are extracted. The signals output to the band-pass filter 34 differ for each input destination of the low-frequency signals F set in the optical transmitting unit 21 of the polarization-multiplexing optical transmitter 2. The input of the low-frequency signals F into the frequency regulator 211, the delay regulator 212, and the output intensity regulator 213 of the optical transmitting unit 21 is sequentially explained below.

The input of the low-frequency signals F into the frequency regulator 211 of the optical transmitting unit 21 is explained first. The signals output from the low-speed photodiode 339 passing through the band-pass filter 333 of the optical receiving unit 33 are output to the band-pass filter 34. The salient features mentioned below are used for outputting the signals to the band-pass filter 34. Because the optical wavelength, which is the carrier wave, is minutely swung by the low-frequency signals F, the signals transmitted from the polarization-multiplexing optical transmitter 2 are sometimes swung by a long wavelength or sometimes by a short wavelength. Thus, in the band-pass filter 333 of the narrow passbands, if the wavelength of the input signals slightly changes, the transmissivity changes significantly. Thus, by using the salient features, if the signals transmitted from the polarization-multiplexing optical transmitter 2 are input into the band-pass filter 333, the intensity of the light output from the band-pass filter 333 can be changed according to the swinging of the input signals. In other words, the cycle of the low-frequency signals F can be converted into the cycle for changing the intensity. Thus, by converting the optical signals output from the band-pass filter 333 into current signals by the low-speed photodiode 339 and inputting the current signals into the band-pass filter 34, the components of the low-frequency signals F can be extracted by the band-pass filter 34.

The input of the low-frequency signals F into the delay regulator 212 of the optical transmitting unit 21 is explained next. The signals output from the phase comparator 335 of the optical receiving unit 33 are output to the band-pass filter 34. The salient features mentioned below are used for outputting the signals to the band-pass filter 34. In the signals transmitted from the polarization-multiplexing optical transmitter 2, the transmission timing of the light is minutely swung by the low-frequency signals F. Thus, the clock regeneration circuit synchronizes the frequency of the clock with the frequency of the received signals. Thus, by using the salient features, if the signals transmitted from the polarization-multiplexing optical transmitter 2 are optical/electric converted and input into the clock regeneration circuit, voltage signals output from the phase comparator 335 can be modified according to a gap in the transmission timing of the input signals. In other words, the components of the low-frequency signals F can be extracted as the modified voltage signals. Thus, by inputting the voltage signals output from the phase comparator 335 into the band-pass filter 34, the components of the low-frequency signals F can be extracted by the band-pass filter 34.

The input of the low-frequency signals F into the output intensity regulator 213 of the optical transmitting unit 21 is explained next. The signals output from the low-speed photodiodes 334 of the optical receiving unit 33 are output to the band-pass filter 34. The salient features mentioned below are used for outputting the signals to the band-pass filter 34. In the signals transmitted from the polarization-multiplexing optical transmitter 2, the optical intensity of the light, which is the carrier wave, is minutely swung by the low-frequency signals F. The low-speed photodiode 334 includes the features of the low-pass filter that only transmits the low-frequency components. Thus, by using the salient features, if the signals transmitted from the polarization-multiplexing optical transmitter 2 are input into the low-speed photodiode 334, the components of the low-frequency signals F corresponding to the low-frequency components of the input signals can be extracted. Thus, by inputting the signals of the low-frequency components output from the low-speed photodiode 334 into the band-pass filter 34, the components of the low-frequency signals F can be extracted by the band-pass filter 34.

As mentioned earlier, in the polarization-multiplexing optical transmitter 2 according to the first embodiment, by using the low-frequency signals F1 and F2 identifiable between the polarization-multiplexing optical transmitter 2 and the polarization-multiplexing optical receiver 3, at least any one of the optical wavelength, which is the carrier wave, the transmission timing and the intensity can be modulated. In the polarization-multiplexing optical receiver 3, by extracting the components of the low-frequency signals F1 and F2 from the split polarization components, the polarization-multiplexing signals can be split while controlling the polarization states such that the intensity of the components will be maximum. Consequently, the polarization components can be stably split using a simple structure.

Figure 8:
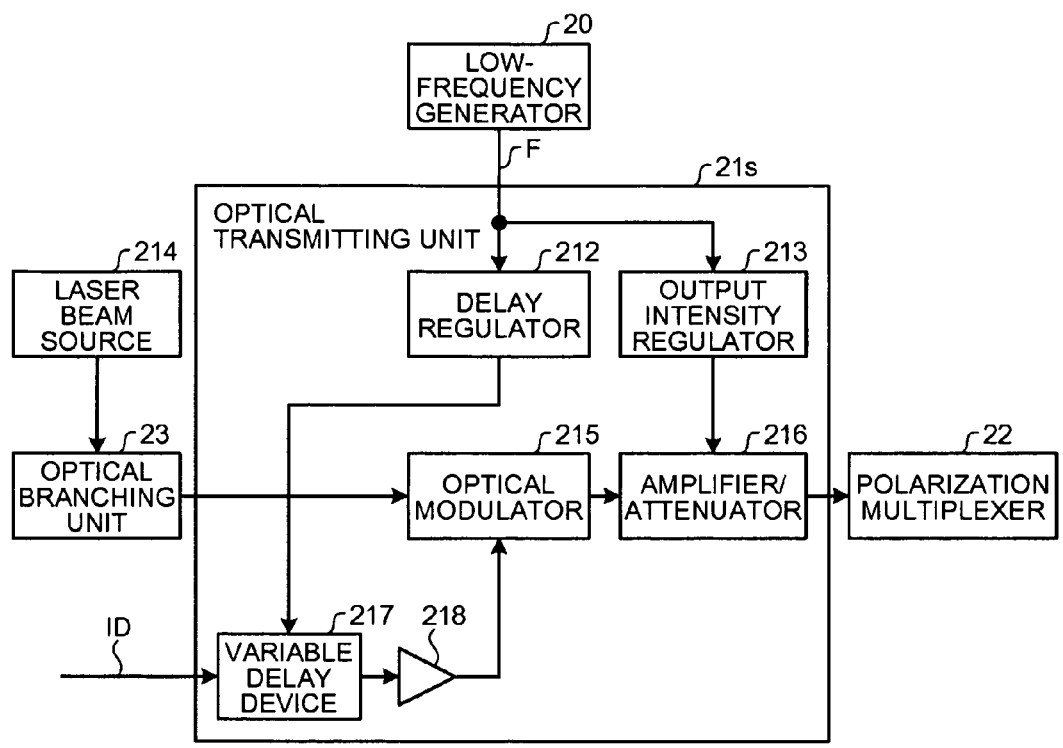
FIG. 8 is a block diagram of an optical transmitting unit according to modifications.

In the first embodiment mentioned earlier, even if the laser beam source 214 is provided in the optical transmitting units 21a and 21b of the polarization-multiplexing optical transmitter 2, the laser beam source 214 can be shared in the optical transmitting units 21a and 21b. Modifications are explained with reference to FIG. 8. FIG. 8 is a block diagram of the optical transmitting unit 21 according to the modifications. Constituent elements similar to those in the first embodiment are indicated by the same reference numerals and a detailed explanation of such elements will not be repeated here. As shown in FIG. 8, the laser beam source 214 and an optical branching unit 23 are provided outside an optical transmitting unit 21s. The optical branching unit 23 branches the light beam emitted from the light beam source 214 in two optical transmitting units 21s. When the laser beam source 214 is shared, an aspect of inputting the low-frequency signals F into the frequency regulator 211, which is mentioned in the first embodiment, is excluded. Thus, the optical transmitting unit 21s does not require the frequency regulator 211.

Figure 9:
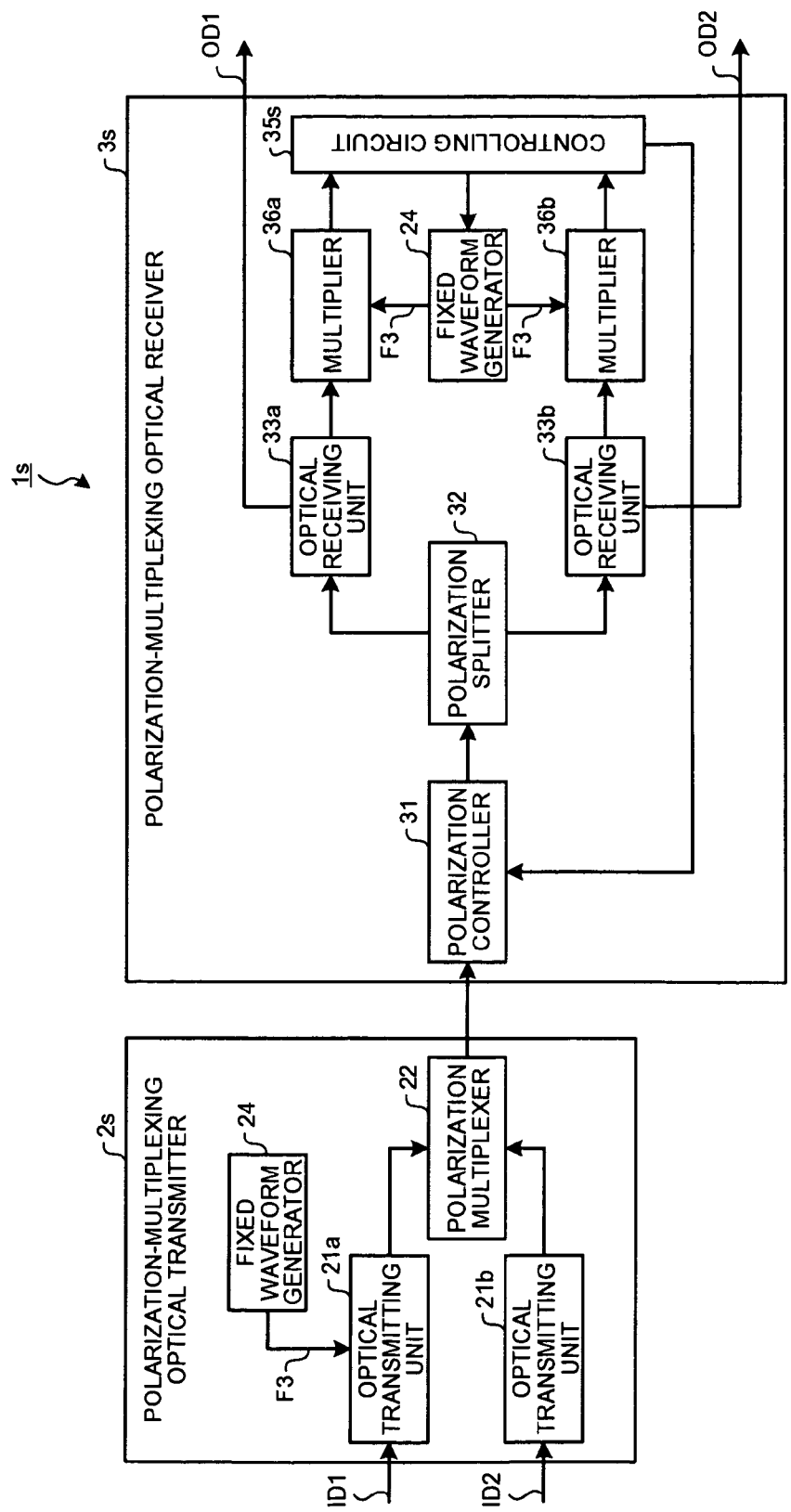
FIG. 9 is a block diagram of a polarization-multiplexing optical transceiving system according to a second embodiment of the present invention.

A second embodiment of the present invention is explained next. FIG. 9 is a block diagram of the polarization-multiplexing optical transceiving system according to the second embodiment. In the first embodiment mentioned earlier, the low-frequency signals F1 and F2 are respectively input into the optical transmitting units 21a and 21b in the polarization-multiplexing optical transmitter 2. However, in the second embodiment, fixed waveform signals F3, which are low-frequency signals, are input only in the optical transmitting unit 21a. The constituent elements similar to those in the first embodiment are indicated by the same reference numerals and a detailed explanation of such elements will not be repeated here.

A polarization-multiplexing optical transmitter 2s according to the second embodiment includes a fixed waveform generator 24 instead of the low-frequency generators 20a and

20b that are used in the polarization-multiplexing optical transmitter 2 according to the first embodiment.

Figure 10:
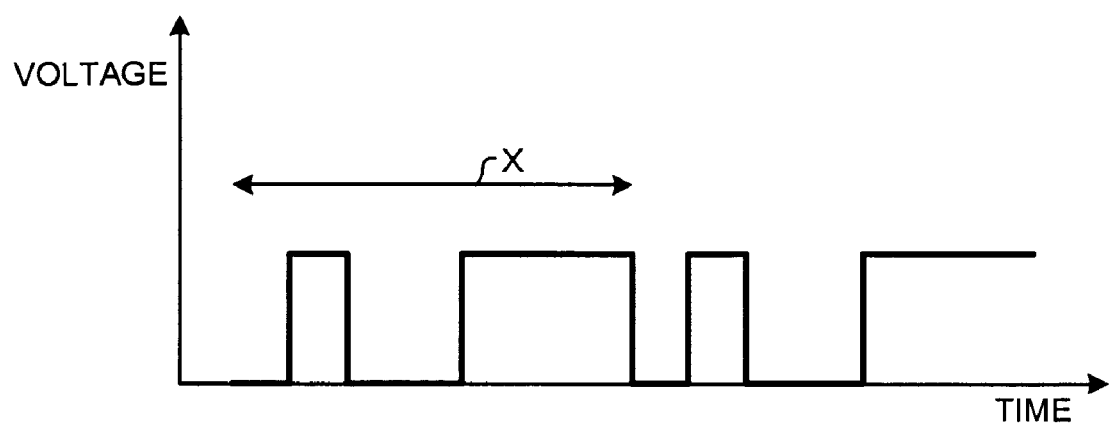
FIG. 10 is a schematic indicating a pattern of fixed waveform signals according to the second embodiment.

The fixed waveform generator 24 transmits the fixed waveform signals F3 to the optical transmitting unit 21a. FIG. 10 is a schematic indicating a pattern of the fixed waveform signals F3. As shown in FIG. 10, in the fixed waveform signals F3 output from the fixed waveform generator 24, the pilot signals including a predetermined cycle X are successively output.

Similarly as in the optical transmitting unit 21 according to the first embodiment, the fixed waveform signals F3 received by the optical transmitting unit 21a are input into at least any one of the frequency regulator 211, the delay regulator 212, and the output intensity regulator 213 of the optical transmitting unit 21. Thus, any one of the optical wavelength, the transmission timing, and the intensity of the carrier wave is minutely swung by the fixed waveform signals F3 and is modulated.

The fixed waveform signals F3 are not input into the optical transmitting unit 21b. Thus, according to the input data signals ID2, the optical transmitting unit 21b modulates any one of the optical phase, the intensity, and the frequency of the carrier wave.

As shown in FIG. 9, a polarization-multiplexing optical receiver 3s according to the second embodiment uses multipliers 36a and 36b and the fixed waveform generator 24 instead of the band-pass filters 34a and 34b used in the polarization-multiplexing optical receiver 3 according to the first embodiment.

The multiplier 36a multiplies the signals output from the optical receiving unit 33a and the fixed waveform signals F3 output from the fixed waveform generator 24. The multiplier 36b multiplies the signals output from the optical receiving unit 33b and the fixed waveform signals F3 output from the fixed waveform generator 24.

By multiplying the two signals, a correlation of the two signals can be determined. In other words, if the components included in the two signals are same, a multiplication value becomes maximum and the highest correlation can be determined. However, if the components included in the two signals are different, the multiplication value becomes minimum and the lowest correlation can be determined.

In the second embodiment, the correlation is determined by using the components of the fixed waveform signals F3 included in the two signals. In other words, a value of the signals output from the multipliers 36a and 36b increases when more and more components of the fixed waveform signals F3 are included in the signals output from the optical receiving units 33a and 33b and the correlation is determined as high. However, the value of the signals output from the multipliers 36a and 36b becomes small when the components of the fixed waveform signals F3 are not included in the signals output from the optical receiving units 33a and 33b and the correlation is determined as low.

In the optical receiving unit 33a according to the second embodiment, it is desirable to input all the signals transmitted from the optical transmitting unit 21a in which the fixed waveform signals F3 are input. Thus, it is desirable to control the signals such that the value of the signals output from the multiplier 36a will be maximum. In the optical receiving unit 33b according to the second embodiment, it is desirable to input all the signals transmitted from the optical transmitting unit 21b in which the fixed waveform signals F3 are not input. Thus, it is desirable to control the signals such that the value of the signals output from the multiplier 36b will be minimum.

A controlling circuit 35s according to the second embodiment generates the feedback control signals for maximizing the value of the signals output from the multiplier 36a and transmits to the polarization controller 31. Furthermore, the controlling circuit 35s generates the feedback control signals for minimizing the value of the signals output from the multiplier 36b and transmits to the polarization controller 31. Thus, the polarization-multiplexing signals can be stably split.

As mentioned earlier, in the polarization-multiplexing optical transmitter 2s according to the second embodiment, by using the fixed waveform signals F3 identifiable between the polarization-multiplexing optical transmitter 2s and the polarization-multiplexing optical receiver 3s, at least any one of the optical waveform, the transmission timing and the intensity of light, which is the carrier wave, can be modulated. In the polarization-multiplexing optical receiver 3s, by extracting the components of the fixed waveform signals F3 from the split polarization components, the polarization-multiplexing signals can be split while controlling the polarization states such that the intensity of the components will be maximum or minimum. Consequently, the polarization components can be stably split using the simple structure.

Figure 11:
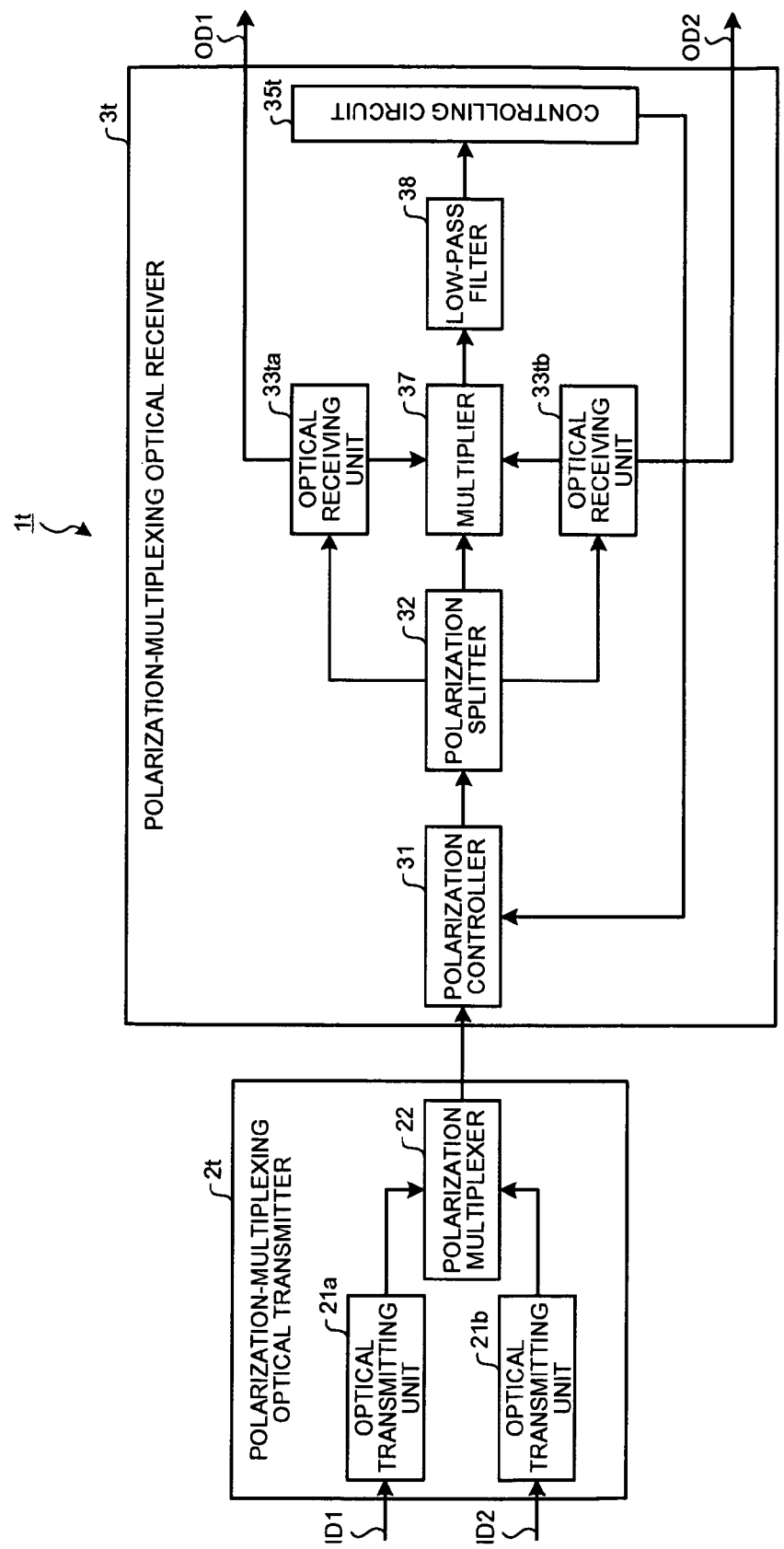
FIG. 11 is a block diagram of a polarization-multiplexing optical transceiving system according to a third embodiment of the present invention.

A third embodiment of the present invention is explained. FIG. 11 is a block diagram of the polarization-multiplexing optical transceiving system according to the third embodiment. In the first embodiment mentioned earlier, the low-frequency signals F1 and F2 are respectively input into the optical transmitting units 21a and 21b in the polarization-multiplexing optical transmitter 2. However, in the third embodiment, the low-frequency signals F1 and F2 are not input. The constituent elements similar to those in the first embodiment are indicated by the same reference numerals and a detailed explanation of such elements will not be repeated here.

In a polarization-multiplexing optical transmitter 2t according to the third embodiment, the low-frequency generators 20a and 20b, which are used in the polarization-multiplexing optical transmitter 2 according to the first embodiment, are not included. Due to this, the optical transmitting units 21a and 21b modulate any one of the optical phase, the intensity, and the frequency of light, which is the carrier wave, according to the input data signals ID1 and ID2 and then output.

A polarization-multiplexing optical receiver 3t according to the third embodiment uses a multiplier 37 and a low-pass filter 38 instead of the band-pass filters 34a and 34b used in the polarization-multiplexing optical receiver 3 according to the first embodiment.

By using the signals respectively output from optical receiving units 33ta and 33tb, the multiplier 37 and the low-pass filter 38 calculate a correlation value between the respective signals.

It is desirable that the signals output from the optical receiving unit 33ta correspond to the signals transmitted from the optical transmitting unit 21a and the signals output from the optical receiving unit 33tb correspond to the signals transmitted from the optical transmitting unit 21b. Furthermore, the signals transmitted from the optical transmitting unit 21a and the signals transmitted from the optical transmitting unit 21b include separate data. Thus, a minimum correlation value is desirable upon multiplying and averaging the signals output from the optical receiving unit 33ta and the signals output from the optical receiving unit 33tb. In the third embodiment, more and more common components are included in the two signals when an anticipated value of the correlation increases. Thus, the polarization-multiplexing signals cannot be stably split.

A controlling circuit 35t according to the third embodiment generates the feedback control signals for minimizing the value of the signals output from the low-pass filter 38 and transmits to the polarization controller 31. Due to this, the polarization-multiplexing signals can be stably split.

Figure 12:
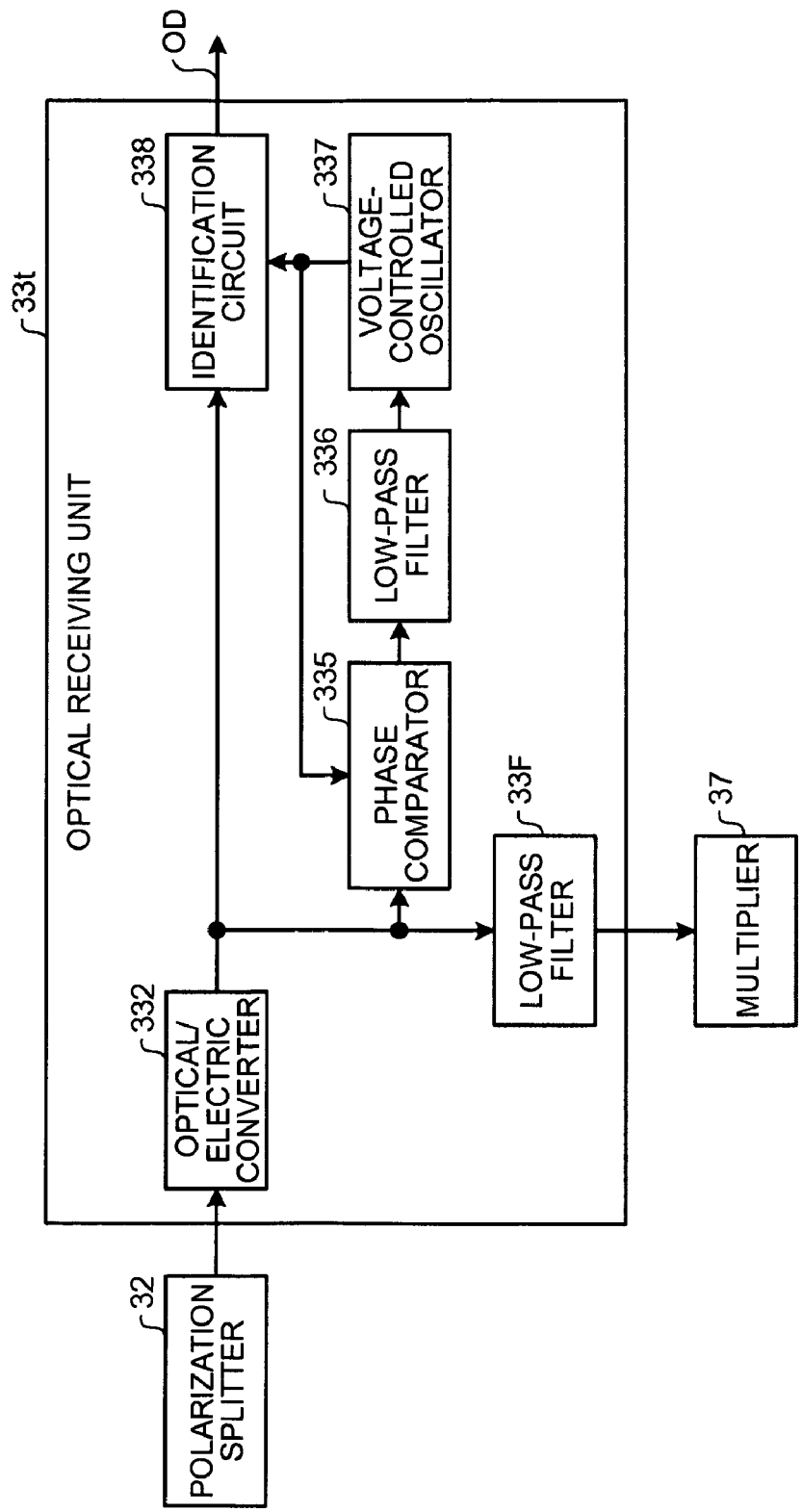
FIG. 12 is a block diagram of an optical receiving unit according to the third embodiment.

FIG. 12 is a block diagram of the optical receiving unit 33t according to the third embodiment. As shown in FIG. 12, the optical receiving unit 33t includes the optical/electric converter 332, the phase comparator 335, the low-pass filter 336, the voltage-controlled oscillator 337, the identification circuit 338, and a low-pass filter 33F. Each constituent element excluding the low-pass filter 33F is similar to each constituent element according to the first embodiment. Thus, the detailed explanation of such elements will not be repeated here.

Among the components included in the signals output from the optical/electric converter 332, the low-pass filter 33F extracts and outputs only the low-frequency components. By outputting the low-frequency components by passing through the low-pass filter 33F and by using only a portion of the components included in the signals output from the optical/electric converter 332, subsequent processes can be executed. Due to this, a circuit structure can be simplified and a cost can be reduced. The low-pass filter 33F can also be omitted. Thus, by using all the components included in the signals output from the optical/electric converter 332, the subsequent processes can be executed and a processing accuracy can be enhanced.

As mentioned earlier, in the polarization-multiplexing optical receiver 3t according to the third embodiment, from the polarization-multiplexing signals transmitted by the polarization-multiplexing optical transmitter 2t, two orthogonal polarization components are respectively extracted and split. The polarization-multiplexing signals can be split while controlling the polarization states such that the correlation value between the signals corresponding to the respective split polarization component will be minimum. Consequently, the polarization components can be stably split using the simple structure.

According to an embodiment of the present invention, in a polarization-multiplexing optical transmitter, by using predetermined pilot signals identifiable between the polarization-multiplexing optical transmitter and a polarization-multiplexing optical receiver, at least any one of an optical wavelength, a transmission timing, and an intensity of light, which is a carrier wave, can be modulated. In the polarization-multiplexing optical receiver, components of the predetermined pilot signals are extracted from split polarization components and polarization-multiplexing signals can be split while controlling polarization states such that the intensity of the components will be maximum or minimum.

According to an embodiment of the present invention, from the polarization-multiplexing signals transmitted by the polarization-multiplexing optical transmitter that is arranged outside, two polarization components orthogonal to each other are respectively extracted and split and the polarization-multiplexing signals can be split while controlling the polarization states such that a correlation value between signals corresponding to respective split polarization component will be minimum.

According to an embodiment of the present invention, the polarization components can be stably split using a simple structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A polarization-multiplexing optical receiver comprising:
    a polarization controller that controls polarization states of externally received polarization-multiplexing signals;
    a polarization splitter that splits, upon respectively extracting, from the polarization-multiplexing signals of which the polarization states are controlled by the polarization controller, a first polarization component and a second polarization component orthogonal to each other;
    a first optical receiver that receives the first polarization component split by the polarization splitter, and externally transmits a first input signal detected from the first polarization component, the first optical receiver having a first band-pass filter that changes an intensity of the first polarization component according to a wavelength swinging of the received first polarization component, and a first low-speed photodiode that converts the first polarization component output from the first band-pass filter into first electric signals;
    a second optical receiver that receives the second polarization component split by the polarization splitter, and externally transmits a second input signal, differing from the first input signal, detected from the second polarization component, the second optical receiver having a second band-pass filter that changes an intensity of the second polarization component according to a wavelength swinging of the received second polarization component, and a second low-speed photodiode that converts the second polarization component output from the second band-pass filter into second electric signals;
    a first detector that extracts a first pilot signal component and a second pilot signal component included in the first electric signals output from the first low-speed photodiode;
    a second detector that extracts a first pilot signal component and a second pilot signal component included in the second electric signals output from the second low-speed photodiode; and
    a controller that calculates a first ratio of the first pilot signal component and the second pilot signal component included in the first electric signals, calculates a second ratio of the first pilot signal component and the second pilot signal component included in the second electric signals, and controls the polarization controller based on the first ratio calculated and the second ratio calculated, wherein
    the first pilot signal is superimposed on the first polarization component and the second pilot signal is superimposed on the second polarization component.

2. The polarization-multiplexing optical receiver according to claim 1, wherein
    an upper limit of a frequency range occupied by the first and second pilot signals is less than or equal to one hundredth of a modulating speed of the first input signal and the second input signal.

3. The polarization-multiplexing optical receiver according to claim 1, wherein
    the first and second detectors include a band-pass filter or a low-pass filter designed such that signals in a frequency range occupied by the first and second pilot signals pass through the band-pass filter or the low-pass filter.

4. A polarization-multiplexing optical transceiving system comprising:
   a polarization-multiplexing optical transmitter; and
   a polarization-multiplexing optical receiver, wherein
   the polarization-multiplexing optical transmitter includes,
      a first optical transmitter that outputs, based on a first input signal, a first modulated light,
      a second optical transmitter that outputs, based on a second input signal differing from the first input signal, a second modulated light,
      a polarization multiplexer that generates, by synthesizing in polarization states orthogonal to each other, the first modulated light output from the first optical transmitter and the second modulated light output from the second optical transmitter, polarization-multiplexing signals, and transmits the polarization-multiplexing signals to the polarization-multiplexing optical receiver,
      a signal generator that generates predetermined pilot signals, wherein
   at least one of the first optical transmitter and the second optical transmitter modulates a wavelength of a carrier wave light by using the pilot signals generated by the signal generator, and
   the polarization-multiplexing optical receiver includes,
      a polarization controller that controls polarization states of the polarization-multiplexing signals received from the polarization-multiplexing optical transmitter,
      a polarization splitter that splits, upon respectively extracting, from the polarization-multiplexing signals of which the polarization states are controlled by the polarization controller, a first polarization component and a second polarization component orthogonal to each other,
      a first optical receiver that receives the first polarization component split by the polarization splitter, and externally transmits a first input signal detected from the first polarization components, the first optical receiver having a first band-pass filter that changes an intensity of the first polarization component according to a wavelength swinging of the received first polarization component, and a first low-speed photodiode that converts the first polarization component output from the first band-pass filter into first electric signals,
      a second optical receiver that receives the second polarization component split by the polarization splitter, and externally transmits a second input signal, differing from the first input signal, detected from the second polarization components, the second optical receiver having a second band-pass filter that changes an intensity of the second polarization component according to a wavelength swinging of the received second polarization component, and a second low-speed photodiode that converts the second polarization component output from the second band-pass filter into second electric signals,
      a first detector that extracts a first pilot signal component and a second pilot signal component included in the first electric signals output from the first low-speed photodiode,
      a second detector that extracts a first pilot signal component and a second pilot signal component included in the second electric signals output from the second low-speed photodiode, and
      a controller that calculates a first ratio of the first pilot signal component and the second pilot signal component included in the first electric signals, calculates a second ratio of the first pilot signal component and the second pilot signal component included in the second electric signals, and controls the polarization controller based on the first ratio calculated and the second ratio calculated, wherein
      the first pilot signal is superimposed on the first polarization component and the second pilot signal is superimposed on the second polarization component.

5. The polarization-multiplexing optical transceiving system according to claim 4, wherein
   an upper limit of a frequency range occupied by the first and second pilot signals is less than or equal to one hundredth of a modulating speed of the first input signal and the second input signal.

6. The polarization-multiplexing optical transceiving system according to claim 4 further comprising:
   an optical source that outputs a carrier wave light; and
   an optical splitter that branches the carrier wave light to the first and second optical transmitters.

7. The polarization-multiplexing optical transceiving system according to claim 4, wherein
   the first and second detectors include a band-pass filter or a low-pass filter designed such that signals in a frequency range occupied by the first and second pilot signals pass through the band-pass filter or the low-pass filter.

8. The polarization-multiplexing optical transceiving system according to claim 4, wherein
   at least one of the first optical transmitter and the second optical transmitter modulates the wavelength of the carrier wave light in the frequency modulation by using the pilot signals generated by the signal generator.

9. A method for controlling a polarization-multiplexing optical transceiving system including a polarization-multiplexing optical transmitter and a polarization-multiplexing optical receiver, comprising:
   in the polarization-multiplexing optical transmitter,
   transmitting a first modulated light based on a first input signal,
   transmitting a second modulated light based on a second input signal differing from the first input signal,
   generating, by synthesizing in polarization states orthogonal to each other, the first modulated light and the second modulated light, polarization-multiplexing signals, and transmitting the polarization-multiplexing signals to the polarization-multiplexing optical receiver, and
   generating predetermined pilot signals, wherein
   at one of the transmitting the first modulated light and the transmitting the second modulated light, further modulating a wavelength of a carrier wave light by using the pilot signals, and
   in the polarization-multiplexing optical receiver,
   controlling polarization states of the polarization-multiplexing signals received from the polarization-multiplexing optical transmitter,
   splitting, upon respectively extracting, from the polarization-multiplexing signals of which the polarization states are controlled at the controlling the polarization, a first polarization component and a second polarization component orthogonal to each other,
   receiving the first polarization component, and externally transmitting a first input signal detected from the first polarization components,
   receiving the second polarization component, and externally transmitting a second input signal, differing from the first input signal, detected from the second polarization components, changing an intensity of the first polarization component according to a wavelength swinging of the received first polarization component, changing an intensity of the second polarization component according to a wavelength swinging of the received second polarization component, converting the first polarization component output into first electric signals, converting the second polarization component output into second electric signals;

extracting a first pilot signal component and a second pilot signal component included in the first electric signals output, extracting a first pilot signal component and a second pilot signal component included in the second electric signals output, calculating a first ratio of the first pilot signal component and the second pilot signal component included in the first electric signals, and calculating a second ratio of the first pilot signal component and the second pilot signal component included in the second electric signals, wherein the controlling includes controlling the polarization states of the polarization-multiplexing signals based on the first ratio calculated and the second ratio calculated, and the first pilot signal is superimposed on the first polarization component and the second pilot signal is superimposed on the second polarization component.

10. The method for controlling a polarization-multiplexing optical transceiving system according to claim 9, wherein an upper limit of a frequency range occupied by the first and second pilot signals is less than or equal to one hundredth of a modulating speed of the first input signal and the second input signal.

11. The method for controlling a polarization-multiplexing optical transceiving system according to claim 9 further comprising:

outputting a carrier wave light; and branching the carrier wave light, wherein using the branched light as the carrier wave when performing the receiving the first polarization component and the receiving the second polarization component.

12. The method for controlling a polarization-multiplexing optical transceiving system according to claim 9 further comprising providing a band-pass filter or a low-pass filter designed such that signals in a frequency range occupied by the first and second pilot signals pass through the band-pass filter or the low-pass filter.

* * * * *